United States Patent [19]
Neuman

[11] 3,767,056
[45] Oct. 23, 1973

[54] INJECTION MOLDING FILTER
[75] Inventor: Gordon E. Neuman, Coon Rapids, Minn.
[73] Assignee: A-1 Engineering, Inc., Anoka, Minn.
[22] Filed: Aug. 6, 1971
[21] Appl. No.: 169,774

[52] U.S. Cl................. 210/409, 210/418, 210/434, 210/446
[51] Int. Cl............................................ B01d 29/20
[58] Field of Search...................... 210/69, 409, 411, 210/427, 428, 421, 434, 446, 498, 418

[56] References Cited
UNITED STATES PATENTS

| 1,477,986 | 12/1923 | Thoens | 210/409 |
| 3,397,794 | 8/1968 | Toth et al. | 210/446 X |
| 281,336 | 7/1883 | Blackmer | 210/434 X |
| 402,957 | 5/1889 | Medrick | 210/433 X |
| 2,838,084 | 6/1958 | Sampler | 210/98 X |
| 3,302,796 | 2/1967 | Downey | 210/498 X |

FOREIGN PATENTS OR APPLICATIONS

| 538,778 | 8/1941 | Great Britain | 55/304 |
| 376,574 | 7/1932 | Great Britain | 210/442 |

Primary Examiner—John Adee
Attorney—Merchant & Gould

[57] ABSTRACT

A filtering device for use in high pressure injection molding apparatus. The filter consists of a housing having a material flow inlet and outlet, the housing having a longitudinal bore which communicates with the inlet and outlet. A cylindrical member having a plurality of radially disposed filtration openings is positioned in the longitudinal bore to define first and second concentrically disposed flow passages. A valve member comprising a tapered pin with a transverse bore registrable with the first passage is rotatable to either block the first passage and thereby effect filtering flow through the radially disposed holes and second passage, or to permit a purge flow through the essentially unrestricted first passage.

15 Claims, 5 Drawing Figures

PATENTED OCT 23 1973　　3,767,056

INVENTOR.
GORDON E. NEUMAN
BY
Merchant & Gould
ATTORNEYS

INJECTION MOLDING FILTER

The invention is directed to a filtering device for use in high pressure injection molding apparatus.

The process of plastic injection molding enjoys widespread use in the formation of many structural components for a number of reasons, including simplicity, rapid production rate, and relatively low operating and part cost. However, in order to maintain product quality, homogeneity and structural strength, it is necessary to filter the hot running plastic to remove impurities, bits of unmelted plastic and the like before it is injected into a mold. Due to its viscous nature, and in order to insure that the mold is completely and properly filled, the hot melted plastic is subjected to pressure on the order of 30,000 PSI by the injection apparatus. In view of this extreme pressure and the degree of filtration necessary to the formation of a desirable product, it will be appreciated that the filtering device is quite susceptible to clogging. Clogging has the initial effect of decreasing the rate at which hot plastic may flow, thereby reducing the rate at which molds can be injection filled. Ultimately, the filter becomes clogged to such a degree that the filtering device must be completely disassembled and cleaned before further injection molding can take place. This, of course, brings production to a halt until the filtering device is reassembled.

My invention alleviates this problem through provision of a filtering device comprising a filtering passage through which the hot running plastic flows during the injection molding process, and a purge passage which is essentially unrestricted and is capable of carrying away all impurities, bits of unmelted plastic and the like collected by the filter. Valve means are used in the device for selectively determining in which passage the plastic will flow.

My inventive device also includes an improved filter, comprising a cylindrical member that concentrically defines the filter and purge passages. The cylindrical member has a plurality of radially disposed holes extending therethrough, each of the holes increasing in cross-sectional area from the inlet to the outlet. Thus, any particle capable of entering the inlet of a filtration opening must also be capable of leaving its outlet; and clogging of the filter opening itself is thus precluded.

From the foregoing, it will be apparent that the improved filter device is less susceptible to clogging than prior art devices, and the filtering portion thereof is quickly and easily purged without disassembly of the entire assembly.

DESCRIPTION OF THE PREFERRED EMBODIMENT

Figure 1:
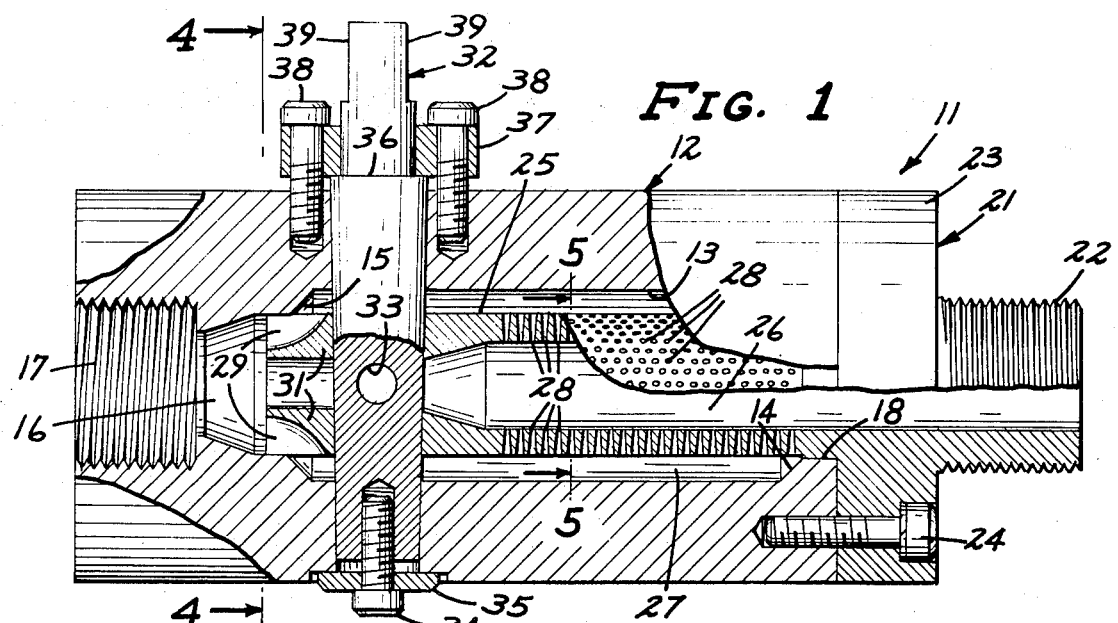
FIG. 1 is a side elevational view of a filtering device embodying the inventive principle, parts thereof being broken away and shown in section.

With reference to the figures, an improved filtering device for use in high pressure injection molding apparatus is represented generally by the numeral 11. Device 11 consists of a cylindrical member 12 having a longitudinal bore 13 of constant diameter. Each end of bore 13 terminates in a 45 degree stepped portion, designated 14, 15, respectively, such portions serving to evenly distribute forces generated by internal pressure, as described in further detail below. Continuing forwardly of stepped portion 15, cylindrical member 12 includes a further stepped portion 16 terminating in an internally threaded outlet 17. Immediately rearward of stepped portion 14 is a short bore 18 having a diameter machined to a predetermined close tolerance for a purpose set forth below.

Projecting into the irregular bore of cylindrical member 12, and in axially alignment therewith, is a filtering member 21. Filtering member 21 has an external portion comprising a threaded inlet 22 and a collar 23 which abuts the end of cylindrical member 12 and is rigidly secured thereto by a plurality of Allenhead machine screws 24.

A tubular member 25 projects inwardly from collar 23, the outer diameter of such member providing a sealed, interference fit with the bore 18. Tubular member 25 defines a first passageway 26 and a second passageway 27 within the bore 13. Passageway 26 is continuous, establishing internal communication between inlet 22 and an outlet 17. Passageway 27 is annular in shape, concentrically disposed with respect to passageway 26, and communicates directly with outlet 17. Passageway 27 communicates with passageway 26 and inlet 22 through a plurality of radially disposed filter holes 28. Preferably, filter holes 28 are arranged in a plurality of circumferential rows, the holes 28 of each row being offset or staggered with respect to the holes of adjacent rows. Each of the filter holes 28 increases in cross-section from passageway 26 to passageway 27 to insure that any particle capable of entering the hole will leave the hole and thereby preclude clogging. In the preferred embodiment, the entrance of a filter hole 28 is 0.040 inches, and its outlet is 0.060 inches.

Figure 4:
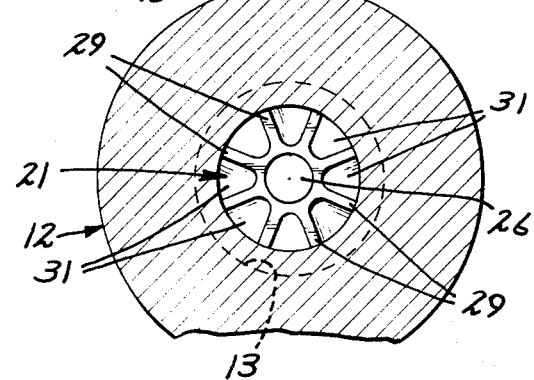
FIG. 4 is a sectional view of the filter device taken along the line 4—4 of FIG. 1.
Figure 5:
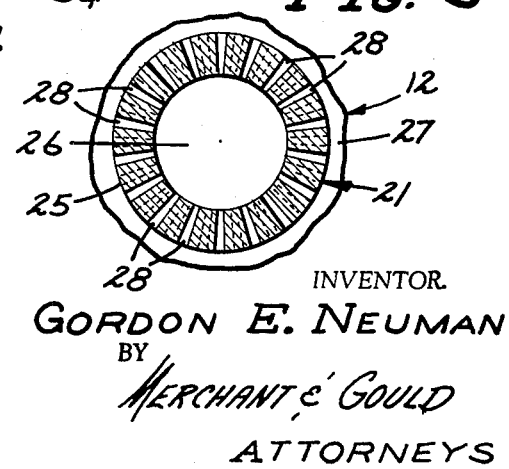
FIG. 5 is a sectional view of the filter device taken along the line 5—5 of FIG. 1.

As shown in FIGS. 1 and 4, the extreme end of filtering member 21 terminates in a nozzle-like configuration consisting of flow guiding fins 29 and streamline flow sections 31 alternately disposed therebetween. Fins 29 and sections 31 establish smooth and continuous flow of the filtered, hot running plastic as it leaves the passageway 27 and enters outlet 17. This structure is of particular importance in that it insures continuous flow of all material passing from passage 27 and precludes the accumulation of melted material at any point. Thus, when material of a different color is passed through the filtering device 11, the possibility of bleeding of a previously accumulated quantity of an earlier used color is eliminated.

Figure 2:
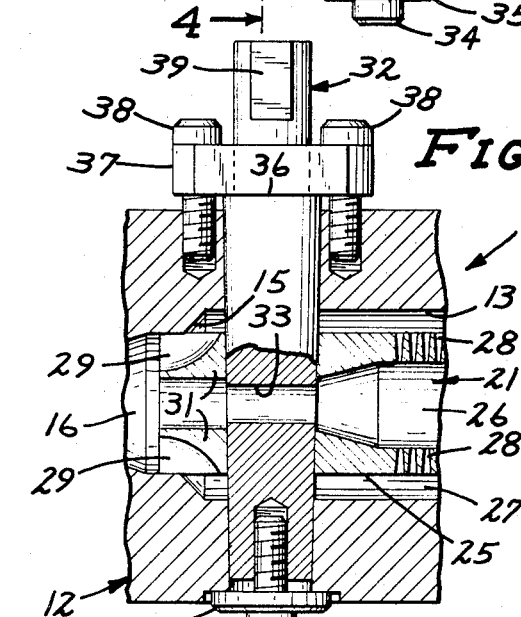
FIG. 2 is a fragmented view of FIG. 1 of the filter device shown in a second operating position.
Figure 3:
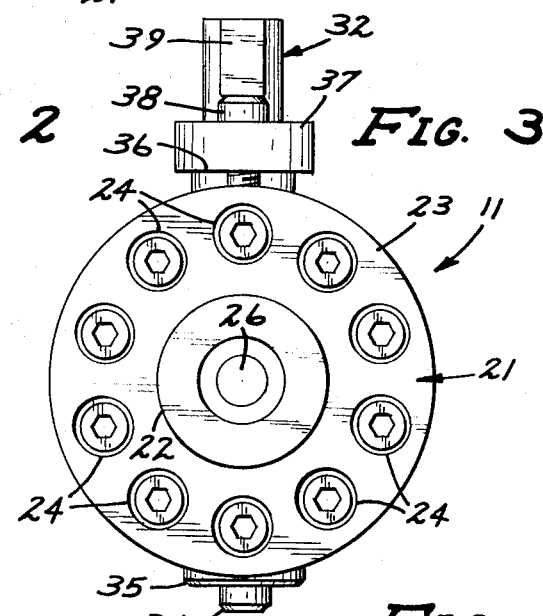
FIG. 3 is an end view of the filter device as seen from right to left in FIG. 1.

Both the cylindrical member 12 and filtering member 21 have transverse bores formed therein which align when filter member is properly oriented. These transverse bores are adapted to receive a valve member 32, which, as best shown in FIGS. 1 and 2, is slightly tapered to provide a desired friction fit. Valve member 32 has a bore 33 formed therein which registers with passageway 26 with proper rotation of valve member 32 (FIG. 2). With valve member 32 rotated to the position shown in FIG. 1, passageway 26 is completely blocked, and all material must pass through filter holes 28 and into passageway 27.

In view of the extremely high pressure to which the internal portions of filter device 11 are subjected, it is necessary to prevent rotation of valve member 32 once it has been placed in a desired operating position. To this end, the bottom end of valve member 32 is drilled and tapped as shown in FIGS. 1 and 2 to receive a machine screw 34 which pulls through recessed washer 35. It will be appreciated that rotation of screw 34 in a clock-wise direction will draw valve member further into its transverse bore to effect a greater friction fit.

The upper end of valve member 32 includes a step 36 adapted to receive a collar 37. Machines screws 38, pass through collar 37 and are threadably received in cylindrical member 12 to force valve member 32 into its transverse bore and thereby increase the friction fit. The extreme upper end of valve member 32 includes flat machined portions 39 to receive a wrench or the like for rotating the valve upon loosening the screws 34 and 38.

In operation, the outlet 17 of filter device 7 is connected to a suitable injection molding nozzle, not shown, and the inlet 22 is connected to a source of hot running plastic under high pressure. Assuming the filter holes 28 to be substantially free of impurities and the like, the valve member 32 is rotated to the position shown in FIG. 1 so that the passageway 26 is completely blocked, and screws 34 and 38 are tightened. This forces the hot running plastic to move radially outward through the filter holes 28 and into annular passageway 27, whereupon it proceeds through outlet 17 in a filtered condition. As pointed out above, impurities greater in size than the entrance of a filter hole 28 are precluded from passing therethrough, and are retained in passageway 26 until subsequently purged. Any impurity or the like small enough to pass through the entrance of a filter hole 28 is deemed to have negligible effect on material quality; and the expanding cross-sectional area of holes 28 insures that such particles will leave the area of filtration and not serve to clog it. Also as pointed out above, the angularly stepped portions 14, 15 serve to evenly distribute the extreme pressure load to the cylindrical member 12, thus precluding destructive forces from acting on the structurally weaker filtering member 21.

Upon accumulation of a predetermined quantity of impurities and the like at the end of passageway 26, screws 34 and 38 are loosened, and valve member 32 is moved to the position shown in FIG. 2 whereupon such impurities are purged from the filtering device 11 by virtue of the essentially unrestricted flow through passage 26. Upon completion of the purge flow, valve member 32 is returned to the position shown in FIG. 1, and screws 34 and 38 are again tightened to provide further filtration of the hot running plastic.

I claim:

1. Apparatus for filtering melted plastic delivered under high pressure to injection molding apparatus and the like, comprising:
   a. a filter housing having an inlet through which a flow of melted plastic is received, an outlet through which melted plastic may leave and a longitudinal bore of predetermined diameter formed therein, the longitudinal bore being angularly stepped down at each end thereof to first and second portions of reduced diameter;
   b. a rigid tubular filtering member of lesser diameter than the longitudinal bore and having a plurality of radially disposed filter openings formed therethrough, the inlet of each opening being smaller than the outlet thereof;
   c. the tubular filtering member being disposed in the longitudinal bore and engageably received by said first and second portions of reduced size in supporting relation thereby;
   d. a first flow passage establishing fluid communication between the housing inlet and outlet and defined in part by the inside of the tubular member;
   e. a second flow passage separate from the first flow passage establishing fluid communication between the housing inlet and outlet and defined in part by the filter openings and space between the tubular member and the housing;
   f. the first flow passage having a lesser resistance to the flow of melted plastic than the second flow passage; and
   g. valve means disposed in the first passage downstream of the filter openings, the valve means being movable to a filtering position for blocking the first flow passage to effect the flow of melted plastic through the second flow passage, and movable to a purge position to open said first flow passage and thereby effect the flow of melted plastic together with filter particles therethrough.

2. The filtering device defined by claim 1, wherein the valve means comprises a rotatable member having a flow opening formed therein, the flow opening disposed to register with said first passage in said purge position.

3. The filtering device defined by claim 1, wherein a transverse bore is formed through the filter housing and the tubular member, and the valve member comprises a cylindrical member disposed in said transverse bore and rotatable therein, the cylindrical member having a flow opening registrable with the first flow passage in the purge position.

4. The filtering device defined by claim 3, and further comprising means for retaining the cylindrical member in a predetermined position.

5. The filtering device defined by claim 4, wherein the cylindrical member is tapered over at least a portion of its length to effect a frictional fit in the transverse bore, and the retaining means comprises means for forcing the tapered cylindrical member into the transverse bore.

6. The filtering device defined by claim 1, wherein the downstream end of the tubular member terminates in a plurality of guiding fins and streamline flow portions defining a part of the second flow passage.

7. The filtering device defined by claim 6 wherein the guiding fins and streamline flow sections are radially arranged and alternately disposed in the end of the tubular member.

8. The apparatus defined by claim 1, wherein the longitudinal bore is stepped down at an angle of 45° to the first and second portions of reduced diameter, respectively.

9. The apparatus defined by claim 1, and further comprising a collar from which the rigid filtering member projects, the collar constructed to abut the filter housing in sealing engagement therewith, and means for movably securing the collar to the filter housing.

10. The apparatus defined by claim 1, wherein the tubular filtering member is constructed for an interference fit with the respective first and second portions of reduced diameter.

11. The apparatus defined by claim 1, wherein the tubular filtering member is disposed in concentric relation with said longitudinal bore.

12. The apparatus defined by claim 1, wherein the filter openings are arranged in a plurality of circumferential rows, the openings of one row being staggered with respect to the openings of adjacent rows.

13. Apparatus for filtering melted plastic delivered under high pressure to injection molding apparatus and the like, comprising:
   a. a filter housing having an inlet through which a flow of melted plastic is received, an outlet through which melted plastic may leave and a longitudinal bore of predetermined diameter formed therein, the longitudinal bore being angularly stepped down at each end thereof to first and second portions of reduced diameter;
   b. a rigid tubular filtering member of lesser diameter than the longitudinal bore and having a plurality of radially disposed filter openings formed therethrough, the inlet of each opening being smaller than the outlet thereof;
   c. the tubular filtering member being disposed in the longitudinal bore and engageably received by said first and second portions of reduced diameter in supporting relation thereby so that an annular passage is defined between the tubular member and the inner wall of the housing;
   d. means for establishing a smooth, streamlined flow path between said annular passage and the filter housing outlet; and
   e. means for normally blocking the downstream end of said tubular filtering member to effect the flow of melted plastic through said filter openings, annular passage, streamlined flow path and out the filter housing outlet.

14. The apparatus defined by claim 13, wherein the means establishing the streamlined flow path comprises a plurality of alternating guiding fins and streamlined flow portions disposed in the downstream end of the tubular filtering member.

15. The apparatus defined by claim 13, wherein the longitudinal bore is stepped down at an angle of 45° to the first and second portions of reduced diameter, respectively.

* * * * *